United States Patent
Dharmasena et al.

(10) Patent No.: US 12,113,163 B2
(45) Date of Patent: Oct. 8, 2024

(54) METHOD OF USING AN ELECTRIC FIELD FOR ROLL-TO-ROLL SEPARATOR COATING

(71) Applicant: GM GLOBAL TECHNOLOGY OPERATIONS LLC, Detroit, MI (US)

(72) Inventors: Ruchira Dharmasena, Shelby Township, MI (US); Shuru Chen, Troy, MI (US); Fang Dai, Troy, MI (US); Mei Cai, Bloomfield Hills, MI (US); Sanaz Ketabi, Holt, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 465 days.

(21) Appl. No.: 17/506,446

(22) Filed: Oct. 20, 2021

(65) Prior Publication Data
US 2023/0121883 A1     Apr. 20, 2023

(51) Int. Cl.
*H01M 10/04*     (2006.01)
*H01M 10/0525*   (2010.01)
*H01M 50/431*    (2021.01)
*H01M 50/446*    (2021.01)

(52) U.S. Cl.
CPC ... *H01M 10/0404* (2013.01); *H01M 10/0525* (2013.01); *H01M 50/431* (2021.01); *H01M 50/446* (2021.01)

(58) Field of Classification Search
CPC ......... H01M 10/0404; H01M 10/0409; H01M 10/0525; H01M 50/431; H01M 50/446; H01M 50/403; H01M 50/406; H01M 50/414; H01M 50/417; H01M 50/434; H01M 50/449; H01M 50/451; H01M 50/457; H01M 50/46
See application file for complete search history.

(56) References Cited

U.S. PATENT DOCUMENTS

2014/0370385 A1*  12/2014  Zeitler .................. H01M 4/134
                                                           427/458
2021/0184200 A1   6/2021   Dharmasena et al.

FOREIGN PATENT DOCUMENTS

JP        2012199036      * 10/2012

OTHER PUBLICATIONS

U.S. Appl. No. 17/172,609, filed Feb. 10, 2021, Dharmasena et al.

* cited by examiner

*Primary Examiner* — Matthew W Van Oudenaren

(57) ABSTRACT

A system for coating a separator for a battery includes a separator feed and collection assembly configured to dispense the separator, a coating distribution device configured to flow a coating material toward the separator, and an electric field generator configured to generate an electric field in a gap between the coating distribution device and the separator.

20 Claims, 3 Drawing Sheets

METHOD OF USING AN ELECTRIC FIELD FOR ROLL-TO-ROLL SEPARATOR COATING

GOVERNMENT CLAUSE

This invention was made with government support under Grant No. DE-EE0008230 awarded by the U.S. Department of Energy. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for coating battery separators using an electric field.

A battery (e.g., a battery for hybrid and/or electric vehicles) includes a separator arranged between electrodes (e.g., an anode and a cathode) of the battery. The separator is a permeable membrane that electrically isolates the electrodes from one another to prevent short circuiting while also allowing ionic flow between the electrodes.

SUMMARY

A system for coating a separator for a battery includes a separator feed and collection assembly configured to dispense the separator, a coating distribution device configured to flow a coating material toward the separator, and an electric field generator configured to generate an electric field in a gap between the coating distribution device and the separator.

In other features, the separator feed and collection assembly includes a spool assembly. The spool assembly includes a source spool configured to hold the separator prior to being coated with the coating material, a collector spool configured to hold the separator subsequent to being coated with the coating material, and a coating drum arranged between the source spool and the collector spool. The coating drum is configured to hold the separator while the separator is coated with the coating material.

In other features, the electric field generator is configured to negatively charge the coating drum to generate the electric field.

In other features, the electric field generator includes a power supply connected to the coating distribution device and the separator feed and collection assembly.

In other features, the power supply includes a positive terminal connected to the coating distribution device and a negative terminal connected to a coating drum of the separator feed and collection assembly.

In other features, the power supply is configured to generate at least a 3 kV/m electric field.

In other features, the coating distribution device includes a syringe configured to flow the coating material into the gap.

In other features, the syringe is configured to flow the coating material at between 0 and 1 microliters per minute.

In other features, the coating material includes a metal oxide and carbon.

In other features, the coating material includes the metal oxide and carbon dissolved in a polymer solution.

In other features, the metal oxide includes titanium dioxide.

In other features, the electric field generator is configured to charge particles of the metal oxide and the carbon.

In other features, the system, further includes a coating control module to control a rate of movement of the separator through the separator feed and collection assembly, a flow rate of the coating material from the coating distribution device, and the generation of the electric field such that the coating material is applied to the separator at a thickness between 2 and 20 µm.

A method for coating a separator for a battery includes, using a separator feed and collection assembly, dispensing the separator at a controlled movement rate, flowing a coating material from a coating distribution device toward the separator, and generating an electric field in a gap between the coating distribution device and the separator.

In other features, the method further includes generating the electric field using a power supply connected to the coating distribution device and the separator feed and collection assembly.

In other features, the method further includes connecting a positive terminal of the power supply to the coating distribution device and a negative terminal of the power supply to a coating drum of the separator feed and collection assembly.

In other features, the electric field is at least 3 kV/m.

In other features, the method further includes flowing the coating material into the gap using a syringe.

In other features, the coating material includes a metal oxide and carbon dissolved in a polymer solution.

In other features, the method further includes controlling the movement rate of the separator, a flow rate of the coating material from the coating distribution device, and the generation of the electric field such that the coating material is applied to the separator at a thickness between 2 and 20 µm.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Battery components may include various coatings to reduce material leakage, improve conductivity, resist corrosion, etc. For example, in lithium ion, lithium-sulfur (Li—S), lithium metal, and/or other types of rechargeable batteries for hybrid or electric vehicles, battery separators may include a thin coating of metal particles, metal oxide particles, conductive particles, etc. An example method of applying a coating on battery separator using a roll-to-roll coating process is described in more detail in U.S. patent application Ser. No. 17/172,609, filed on Feb. 10, 2021, the entire contents of which are incorporated herein.

Separator coating systems and methods according to the present disclosure are configured to generate an electric field to facilitate application of a coating to a battery separator arranged between electrodes (e.g., an anode and a cathode) of a battery, such as an Li—S battery. For example, the electric field is used to apply a coating including nanomaterials (e.g., such as a combination of metal oxides and carbon) to a battery separator. The coating may be applied at a controlled thickness as low as 2 to 20 µm at increments of approximately (e.g., within +/−25% of) 1 µm. Although described herein with respect to vehicle batteries (e.g., rechargeable batteries for electric or hybrid vehicles), the principles of the present disclosure may be applied to batteries used in non-vehicle applications.

Figure 1:
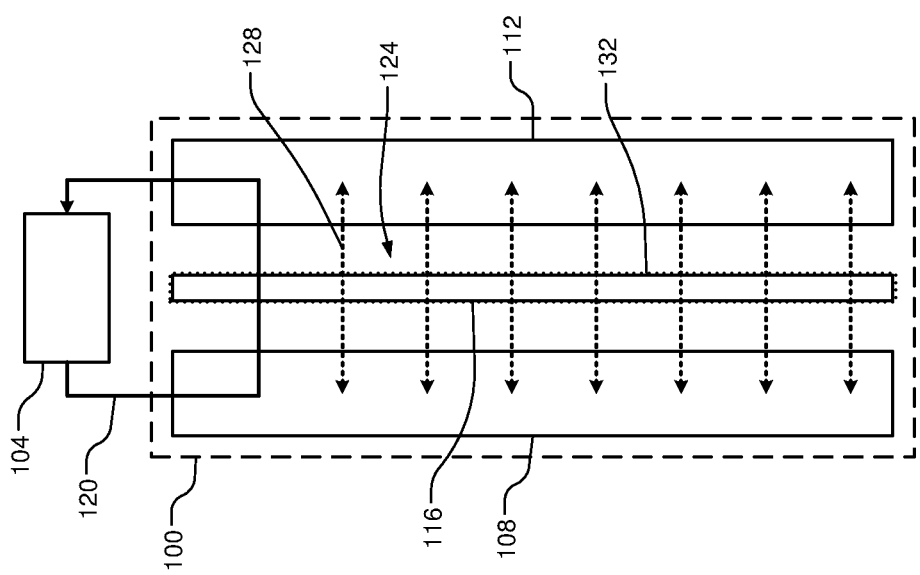
FIG. 1 is an example battery including a separator according to the present disclosure.

An example battery 100 for powering a load 104 is shown in FIG. 1. For example, the battery 100 corresponds to a lithium ion, Li—S, or lithium metal battery for a vehicle. The battery 100 includes an anode 108, a cathode 112, and a separator 116 arranged between the anode 108 and the cathode 112. For example, the separator 116 is comprised of a flexible, permeable membrane. When powering the load 104 (i.e., discharging), current flows from the cathode 112 to the anode 108 and through the load 104 in a direction indicated by arrow 120. Conversely, when charging (e.g., using a motor or other charging source), current flows from a charging source through the anode 108 and into the cathode 112 in a direction opposite the arrow 120.

An electrolyte material 124 contained within the battery 100 surrounds the anode 108 and the cathode 112. The separator 116 electrically isolates the anode 108 and the cathode 112 from each other while allowing charged ions of the electrolyte material 124 to flow through the separator 116 as shown by arrows 128. The separator 116 according to the present disclosure includes a coating 132 applied as described below in more detail. For example, the coating 132 is comprised of a metal oxide (e.g., titanium dioxide) and carbon.

Figure 2:
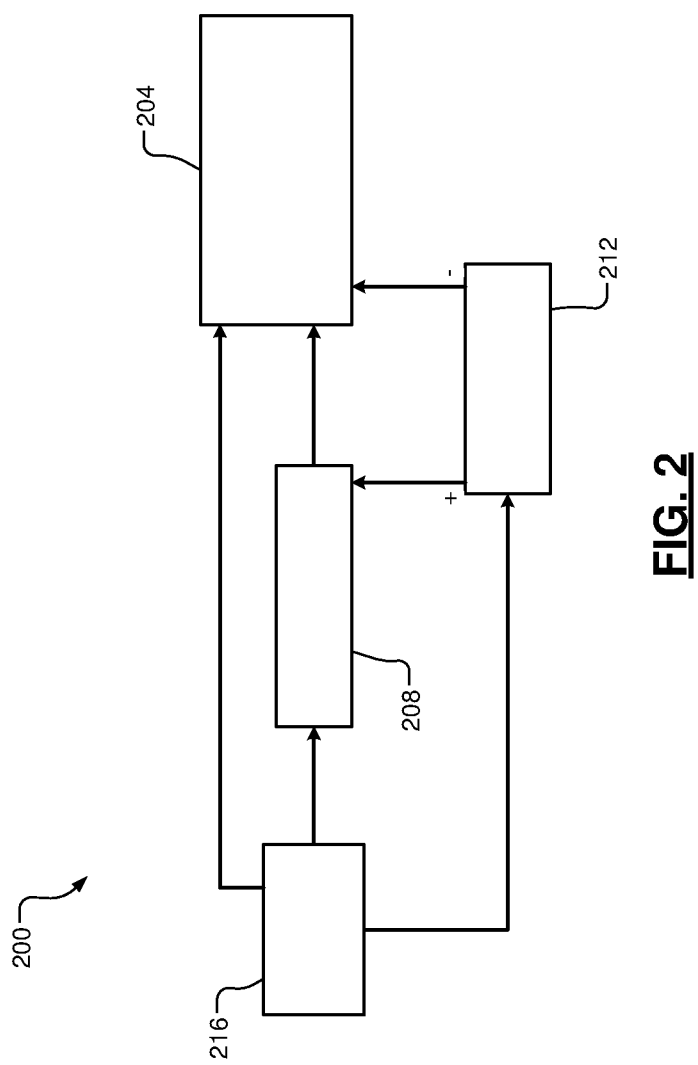
FIG. 2 is an example separator coating system according to the present disclosure.

Referring now to FIG. 2, an example separator coating system 200 according to the present disclosure is configured to apply a coating to a battery separator arranged within a separator feed and collection assembly 204. For example only, the separator is comprised of a polyolefin-based polymer, such as a polymer including polyethylene and/or polypropylene. The separator feed and collection assembly 204 is configured to feed (i.e., dispense) and collect sheets or ribbons of the separator to be coated by a coating distribution device 208 as described below in more detail.

An electric field generator, such as a high-voltage (e.g., between 2 and 50 kV) power supply 212, is arranged to generate an electric field between the coating distribution device 208 and the separator feed and collection assembly 204 such that the separator is surrounded by the electric field. For example, a positive terminal of the power supply 212 is connected to the coating distribution device 208 and a negative terminal of the power supply 212 is connected to the separator feed and collection assembly 204. For example only, the power supply 212 generates a 3 kV/m (3000 volts per meter) electric field between the coating distribution device 208 and the separator feed and collection assembly 204 while the coating distribution device 208 sprays a coating material (e.g., a metal oxide and carbon solution) through the electric field and onto the separator.

A coating control module 216 is configured to control the separator feed and collection assembly 204, the coating distribution device 208, and the power supply 212 to apply the coating to the separator at a controlled thickness (e.g., a thickness between 2 and 20 µm at increments of approximately (e.g., within +/−25% of) 1 µm). For example, the coating control module 216 controls a dispensing rate or speed of the separator (e.g. as performed by the separator feed and collection assembly 204), a strength of the electric field generated by the power supply 212, a flow rate of the coating distribution device 208, etc. to control a thickness of the coating applied to the separator.

Figure 3:
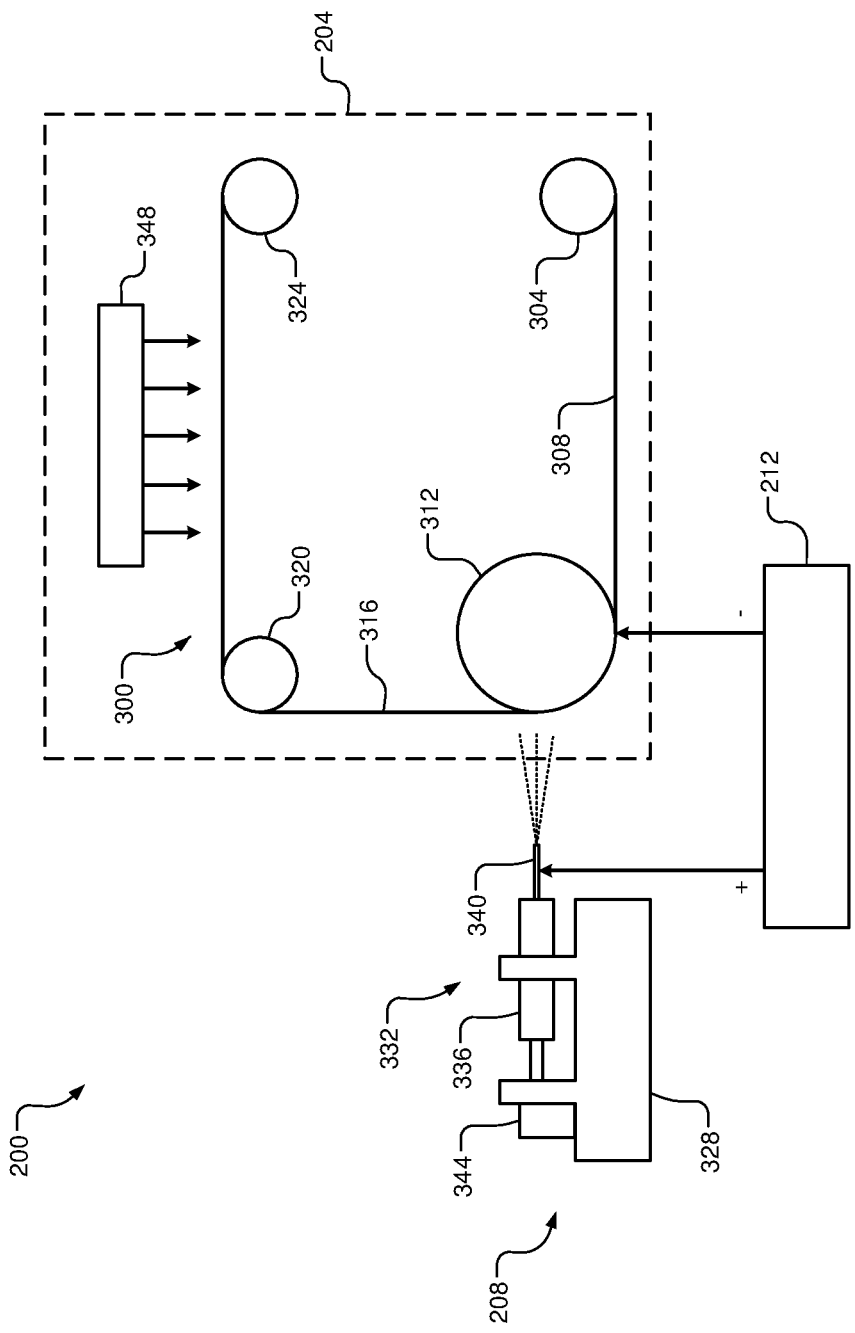
FIG. 3 is the example separator coating system of FIG. 2 shown in more detail.

An example of the separator coating system 200 is shown in more detail in FIG. 3. In this example, the separator feed and collection assembly 204 implements a spool assembly 300 that includes a plurality of spools, drums, or rollers configured to feed and hold the separator during application of the coating. For example, the spool assembly 300 includes a source spool 304 holding uncoated separator 308. In other words, the uncoated separator 308 is wound around the source spool 304.

The source spool 304 feeds the uncoated separator 308 to a coating drum 312 and coated separator 316 is fed from the coating drum 312, around an optional intermediate spool 320, and to collector spool 324. For example, one or more of the source spool 304 and the collector spool 324 is controlled (e.g., in response to commands from the coating control module 216 to respective motors, not shown) to rotate at a controlled rate to achieve a desired thickness of the coating on the separator 308/316.

The coating distribution device 208 includes a base 328 configured to support distribution device such as a spinneret or syringe (e.g., as shown, a syringe 332 including a barrel 336 and a nozzle or needle 340). Although shown with a single syringe 332, in other examples the coating distribution device 208 may include two or more of the syringes 332 in a vertical or horizontal array. The syringe 332 is configured to dispense or spray a coating material (e.g., a metal oxide and carbon mixture) from the barrel 336 and through the needle 340. In some examples, the coating material is stored within and/or provided to the barrel 336 as a liquid or ink. In other examples, the coating distribution device 208 may include an aerosolizer, atomizer, etc. configured to aerosolize the liquid for dispensing.

The coating distribution device 208 is configured to flow the coating material at a controlled rate. For example, a pump 344 responsive to the coating control module 216 is configured to flow the coating material through the syringe 332. The rate may be relatively slow (e.g., between 0 and 1 microliter per minute) to achieve a very thin thickness (e.g., 20 µm or less). Accordingly, the material may not be dispensed with sufficient force to reach and coat the separator 308. For example, even with a small gap between the needle 340 and the separator 308 (e.g., less than 10 cm), the dispensed material may simply drip downward from the needle 340. Accordingly, the power supply 212 generates an electric field between the needle 340 and the coating drum 312 to facilitate application of the coating material as described below in more detail.

For example, a positive terminal of the power supply 212 is connected to the needles 340 a negative terminal of the power supply 212 is connected to the coating drum 312. In other words, the coating drum 312 is negatively charged. Accordingly, the power supply 212 generates a 3 kV/m electric field in a gap between the coating distribution device 208 and the separator feed and collection assembly 204 while the coating material is dispensed from the needle 340.

The coating material includes particles that are configured to carry a charge generated by the electric field. For example, the coating material includes a metal oxide and carbon dissolved in a polymer solution (e.g., a polymer such as polyvinylidene fluoride, or PVDF, and Dimethylformamide, or DMF). For example, the coating material includes titanium dioxide and carbon nano-particles dissolved in the polymer solution. As the coating material is dispensed from the needles 340, the metal oxide and carbon particles are charged (i.e., ionized) by the electric field and float or drift across the gap to coat the separator 308. In some examples, the coating distribution device 208 is configured to oscillate in one or more directions (e.g., in a direction parallel and/or perpendicular to a movement direction of the separator 308) to facilitate distribution of the coating material across an entire width of the separator 308.

The separator coating system 200 may include a dryer 348. For example, the dryer 348 may be incorporated within the separator feed and collection assembly 204. In one example, the dryer 348 is an electrically-powered dryer responsive to the coating control module 216. The dryer 348 directs warm air at the coated separator 316 to dry the coating material. In this manner, the dryer 348 ensures that the coating material has fully dried prior to the coated separator 316 being wound onto the collector spool 324.

Figure 4:
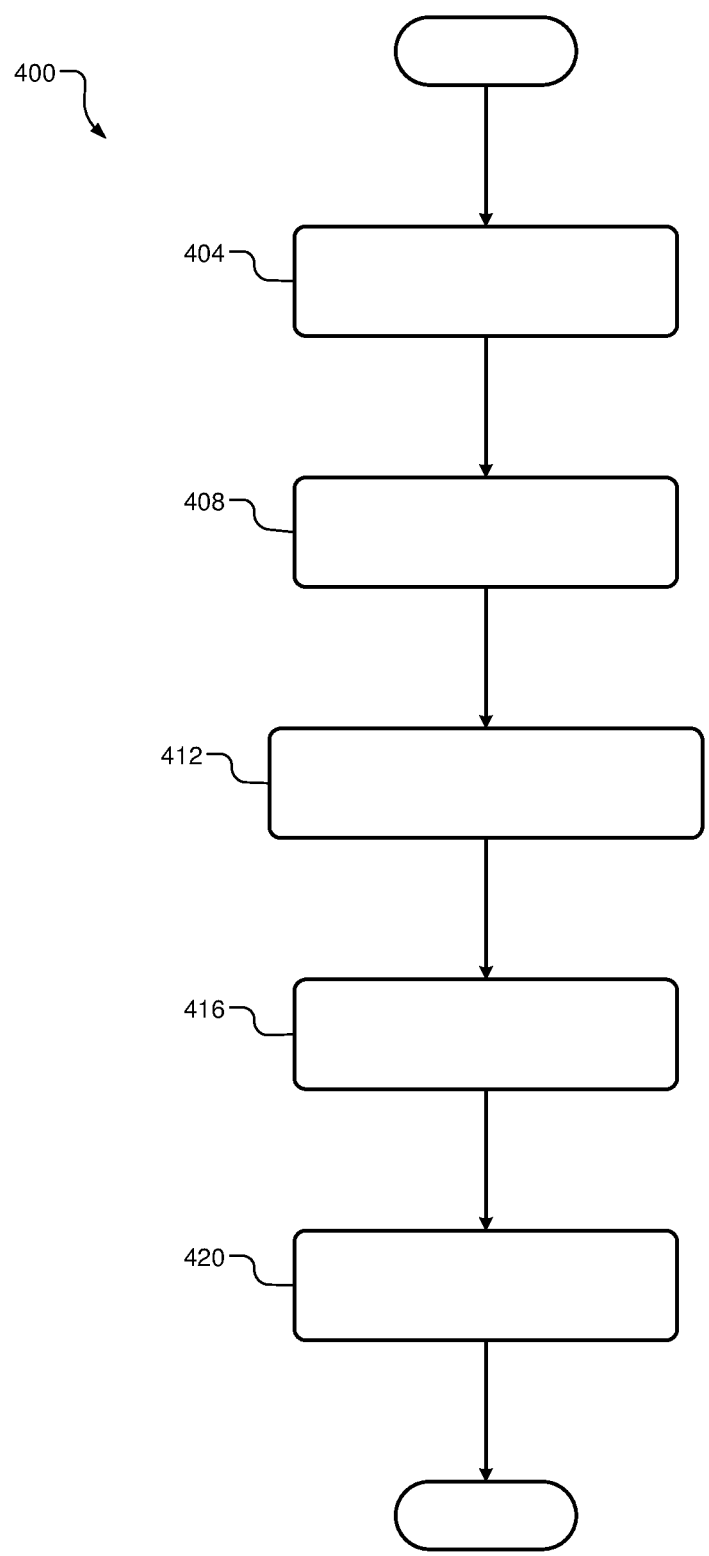
FIG. 4 illustrates steps of an example method for coating a separator for a battery according to the present disclosure.

FIG. 4 shows an example method 400 for coating a separator for a battery according to the present disclosure. At 404, a separator (e.g., the uncoated separator 308) is arranged in the separator feed and collection assembly 204. At 408, the method 400 (e.g., using an electric field generator, such as the power supply 212) generates an electric field in a gap between a coating distribution device and the separator.

At 412, the method 400 (e.g., the coating control module 216) operates a pump to dispense a coating material while also controlling movement of the separator. For example, the coating control module 216 controls motors to rotate one or more spools of the spool assembly 300 (e.g. to transfer the separator from the source spool 304 to the collector spool 324) while controlling the syringe 332 to dispense the coating material into the electric field.

At 416, the method 400 (e.g., the dryer 348) selectively directs warmed air at the separator to dry the coating material. At 420, the method 400 may optionally be repeated to coat an opposite side of the separator. For example, the separator may be removed from and reloaded into the separator feed and collection assembly 204 such that an opposite side of the separator faces the syringe 332.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for coating a separator for a battery, the system comprising:
    a separator feed and collection assembly configured to dispense the separator;
    a coating distribution device configured to flow a coating material toward the separator; and
    an electric field generator configured to generate an electric field in a gap between the coating distribution device and the separator,
    wherein the coating material includes a metal oxide and carbon.

2. The system of claim 1, wherein the separator feed and collection assembly includes a spool assembly, and wherein the spool assembly comprises:
    a source spool configured to hold the separator prior to being coated with the coating material;
    a collector spool configured to hold the separator subsequent to being coated with the coating material; and
    a coating drum arranged between the source spool and the collector spool, wherein the coating drum is configured to hold the separator while the separator is coated with the coating material.

3. The system of claim 2, wherein the electric field generator is configured to negatively charge the coating drum to generate the electric field.

4. The system of claim 1, wherein the electric field generator includes a power supply connected to the coating distribution device and the separator feed and collection assembly.

5. The system of claim 4, wherein the power supply includes a positive terminal connected to the coating distribution device and a negative terminal connected to a coating drum of the separator feed and collection assembly.

6. The system of claim 4, wherein the power supply is configured to generate at least a 3 kV/m electric field.

7. The system of claim 1, wherein the coating distribution device includes a syringe configured to flow the coating material into the gap.

8. The system of claim 7, wherein the syringe is configured to flow the coating material at between 0 and 1 microliters per minute.

9. The system of claim 1, wherein the coating material includes the metal oxide and carbon dissolved in a polymer solution.

10. The system of claim 9, wherein the metal oxide includes titanium dioxide.

11. The system of claim 9, wherein the electric field generator is configured to charge particles of the metal oxide and the carbon.

12. The system of claim 1, further comprising a coating control module to control a rate of movement of the separator through the separator feed and collection assembly, a flow rate of the coating material from the coating distribution device, and the generation of the electric field such that the coating material is applied to the separator at a thickness between 2 and 20 μm.

13. A method for coating a separator for a battery, the method comprising:
    using a separator feed and collection assembly, dispensing the separator at a controlled movement rate;
    flowing a coating material from a coating distribution device toward the separator; and
    generating an electric field in a gap between the coating distribution device and the separator,
    wherein the coating material includes a metal oxide and carbon.

14. The method of claim 13, further comprising generating the electric field using a power supply connected to the coating distribution device and the separator feed and collection assembly.

15. The method of claim 14, further comprising connecting a positive terminal of the power supply to the coating distribution device and a negative terminal of the power supply to a coating drum of the separator feed and collection assembly.

16. The method of claim 13, wherein the electric field is at least 3 kV/m.

17. The method of claim 13, further comprising flowing the coating material into the gap using a syringe.

18. The method of claim 13, wherein the metal oxide and carbon is dissolved in a polymer solution.

19. The method of claim 18, further comprising controlling the movement rate of the separator, a flow rate of the coating material from the coating distribution device, and the generation of the electric field such that the coating material is applied to the separator at a thickness between 2 and 20 μm.

20. A system for coating a separator for a battery, the system comprising:
- a separator feed and collection assembly configured to dispense the separator;
- a coating distribution device configured to flow a coating material toward the separator;
- an electric field generator configured to generate an electric field in a gap between the coating distribution device and the separator; and
- a coating control module to control a rate of movement of the separator through the separator feed and collection assembly, a flow rate of the coating material from the coating distribution device, and the generation of the electric field such that the coating material is applied to the separator at a thickness between 2 and 20 μm.

* * * * *